(12) United States Patent
Sugaya

(10) Patent No.: US 6,449,015 B1
(45) Date of Patent: Sep. 10, 2002

(54) REDUNDANT PICTURE DETECTING DEVICE, AND PICTURE CONVERTING APPARATUS EMPLOYING THE SAME

(75) Inventor: Kazumi Sugaya, Tsurugashima (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/270,828

(22) Filed: Mar. 18, 1999

(30) Foreign Application Priority Data

Mar. 20, 1998 (JP) .......................................... 10-072889

(51) Int. Cl.$^7$ ................................................ H04N 7/01
(52) U.S. Cl. ...................... 348/459; 348/441; 348/911; 348/97
(58) Field of Search ................................ 348/459, 441, 348/445, 443, 446, 448, 911, 97, 526, 715, 714; 386/131, 124, 40

(56) References Cited

U.S. PATENT DOCUMENTS

| | | | | |
|---|---|---|---|---|
| 5,461,420 A | * | 10/1995 | Yonemitsu et al. | .......... 348/401 |
| 5,671,008 A | * | 9/1997 | Linn | ............................ 349/97 |
| 5,703,654 A | * | 12/1997 | Iizuka | ........................ 348/446 |
| 5,745,645 A | * | 4/1998 | Nakamura et al. | ........... 386/131 |
| 5,844,618 A | * | 12/1998 | Horiike et al. | ............... 348/441 |
| 5,852,473 A | * | 12/1998 | Horne et al. | ................. 348/558 |
| 5,892,550 A | * | 4/1999 | Iwasaki et al. | .............. 348/443 |
| 5,982,444 A | * | 11/1999 | Kato et al. | ................... 348/446 |
| 6,144,410 A | * | 11/2000 | Kikuchi et al. | ............. 348/441 |
| 6,266,081 B1 | * | 7/2001 | Ono et al. | ..................... 348/97 |
| 6,282,245 B1 | * | 8/2001 | Oishi et al. | ............. 375/240.26 |

* cited by examiner

Primary Examiner—John Miller
Assistant Examiner—Jean W. Désir
(74) Attorney, Agent, or Firm—Morgan, Lewis & Bockius LLP

(57) ABSTRACT

A redundant picture detecting device includes: a calculator for calculating difference information indicating a difference between a unit picture and a subsequent unit picture having an identical phase for each of the unit pictures; a multiplier for multiplying the difference information of a unit picture preceding an object unit picture by a predetermined first constant to produce a preceding difference information and for multiplying the difference information of a unit picture following the object unit picture by the first constant to produce a following difference information, the first constant being greater than zero and smaller than 1; and a judging unit for judging that the object unit picture is a redundant picture if the difference information of the object information is smaller than both of the preceding difference information and the following difference information.

30 Claims, 5 Drawing Sheets

REDUNDANT PICTURE DETECTING DEVICE, AND PICTURE CONVERTING APPARATUS EMPLOYING THE SAME

BACKGROUND OF THE INVENTION

1. Field of the Invention

This invention relates to a picture converting device which converts picture information of a certain type to picture information of another type having different number of unit pictures per unit time, e.g., converting an NTSC (National Television System Committee) video signal (including 30 frame pictures per second) into picture information having 24 frame pictures per second.

2. Description of the Prior Art

Recently, there is broadly known a DVD which is a storage medium having a remarkably improved recording capacity. Now, it is assumed that a certain film (i.e., including 24 frame pictures per second) is recorded on a DVD. Normally, the picture information to be recorded on a DVD must be an NTSC video signal (i.e., including 30 frame pictures per second). Therefore, conventionally, the film or movie material including 24 frame pictures per second is converted into the video signal including 30 frame pictures per second by a so-called telecine conversion (also called as "2–3 pull-down conversion"). Subsequently, the video signal thus obtained is converted into digital picture signal constituted by plural pixels, and then the digital picture signal is recorded on a DVD by using a picture coding technique of so-called MPEG-2 (Moving Picture Expert Group-2) system. This will be described in more detail with referring to FIG. 1. FIG. 1 shows the manner of telecine conversion. By telecine converting the frame pictures 30 to 34 of the movie material including 24 frame pictures per second, the video signal is obtained which includes the pictures of first field 40, 42, 44, 46, 48, 50 and 52 and the pictures of second field 41, 43, 45, 47, 49 and 51. The pairs of field pictures 40 and 41, 42 and 43, 44 and 45, 46 and 47, 48 and 49, 50 and 51 constitute one frame picture in the video signal, respectively.

The above mentioned telecine conversion produces video signal including 30 frame pictures per second from the movie material signal including only 24 frame pictures per second, and hence there may occur the cases where an identical field picture is used twice as two field pictures (one of those two identical field pictures will be hereinafter referred to as "redundant field picture") and/or two field pictures originating from different picture and hence having different contents constitute one frame picture. The redundant field picture is one of the successive identical field pictures in the same phase, and in the example of FIG. 1 the field pictures 40 and 42, 45 and 47, 50 and 52 are the redundant field pictures, respectively. Here, the same phase means that both of the two field pictures belong to first field (odd field) or second field (even field). Also in FIG. 1, the field pictures of different contents, i.e., the field pictures 42 and 43, 44 and 45, constitute one frame picture. When the video signal obtained by the telecine conversion is recorded on a DVD according to MPEG-2 system, if the multiple redundant field pictures having the same contents are included in the video signal to be recorded, the MPEG-2 coding processing must be performed redundantly for those redundant pictures. Also, if two field pictures having non-analogous contents constitute one frame picture, there is less correlation between those two field pictures in the sense of MPEG-2 system. In both cases, the efficiency of coding according to MPEG-2 system may necessarily be degraded.

In this view, if the telecine-converted video signal is recorded on a DVD, prior to the MPEG-2 coding processing, the video signal is converted again into the picture signal including 24 frame; pictures per second (i.e., the reverse telecine conversion is applied), and then coded by MPEG-2 system.

The conventional reverse telecine conversion is carried out as follows. First, for successive two field pictures of the same phase (i.e., first field or second field, odd field or even field), the luminance of each pixel of one field picture is compared with the luminance of the corresponding pixel of the other field picture so as to calculate the absolute value of the luminance difference of those corresponding pixels, and then the absolute values of the luminance difference are totalized for all pixels in one field picture to calculate the absolute value sum. Then, the absolute value sum are compared with a threshold value which is experimentally predetermined. If the absolute value sum is smaller than the threshold, it is determined that those field pictures are the redundant field pictures. Based on this result, the video signal is converted into the picture signal including 24 frame pictures per second, with eliminating the redundant fields thus detected.

In theory, the absolute value sum is zero in the case of redundant fields. However, in the case of actual video signal, the absolute value sum rarely becomes zero because of the noise and the like introduced during the telecine conversion processing, and the absolute value sum may also vary dependently upon the kinds of the original movie material and/or the condition during the telecine conversion. Therefore, in the above-mentioned method of detecting the redundant field pictures using a constant threshold, the redundant field picture cannot be correctly detected, and such incorrect detection of the redundant field pictures still deteriorates the coding efficiency by the MPEG-2 system.

SUMMARY OF THE INVENTION

In view of the above mentioned problem, an object of the present invention is to provide a redundant picture detecting device capable of accurately and stably detecting the redundant field pictures in a video signal, especially caused by the telecine conversion.

Another object of the present invention is to provide a picture converting device which performs picture conversion utilizing the above redundant picture detecting device and a picture recording medium for recording picture information produced by the picture conversion.

According to one aspect of the present invention, there is provided a redundant picture detecting device including: a calculator for calculating difference information indicating a difference between a unit picture and a subsequent unit picture having an identical phase for each of the unit pictures; a multiplier for multiplying the difference information of a unit picture preceding an object unit picture by a predetermined first constant to produce a preceding difference information and for multiplying the difference information of a unit picture following the object unit picture by the first constant to produce a following difference information, the first constant being greater than zero and smaller than 1; and a judging unit for judging that the object unit picture is a redundant picture if the difference information of the object information is smaller than both of the preceding difference information and the following difference information.

There is also provided a redundant picture detecting method including the steps of: calculating difference information indicating a difference between a unit picture and a subsequent unit picture having an identical phase for each of the unit pictures; multiplying the difference information of a unit picture preceding an object unit picture by a predetermined first constant to produce a preceding difference information and for multiplying the difference information of a unit picture following the object unit picture by the first constant to produce a following difference information, the first constant being greater than zero and smaller than 1; and judging that the object unit picture is a redundant picture if the difference information of the object information is smaller than both of the preceding difference information and the following difference information.

In accordance with the device or method thus configured, difference information indicating a difference between a unit picture and a subsequent unit picture having an identical phase is calculated for each of the unit pictures. Then, the difference information of a unit picture preceding an object unit picture is multiplied by a predetermined first constant to produce a preceding difference information, and the difference information of a unit picture following the object unit picture is multiplied by the first constant to produce a following difference information, wherein the first constant is greater than zero and smaller than 1. Then, it is judged that the object unit picture is a redundant picture if the difference information of the object information is smaller than both of the preceding difference information and the following difference information. Therefore, the redundant pictures can be correctly and reliably detected.

Further, the judging unit or step,may judge that the object unit picture is a redundant picture if the difference information of the object information is smaller than both of the preceding difference information and the following difference information and if the difference information of the object unit picture is smaller than the difference information of both the unit picture preceding the object unit picture and the unit picture following to the object unit picture. Therefore, the accuracy of the detection may be further improved.

Also, the judging unit or step may judge that the object unit picture is a redundant picture if the difference information of the object information is smaller than both of the preceding difference information and the following difference information and if the difference information of the object unit picture is smaller than a predetermined second constant. Thus, the accuracy of the detection may be further improved.

According to another aspect of the present invention, there is provided a redundant picture detecting device including: a calculator for calculating difference information indicating a difference between a unit picture and a subsequent unit picture having an identical phase for each of the unit pictures; and a judging unit for judging that the object unit picture is a redundant picture if the difference information of the object information is smaller than both of the difference information of a unit picture preceding to the object unit picture and the difference information of a unit picture following the object unit picture.

There is also provided a redundant picture detecting method including the steps of: calculating difference information indicating a difference between a unit picture and a subsequent unit picture having an identical phase for each of the unit pictures; and judging that the object unit picture is a redundant picture if the difference information of the object information is smaller than both of the difference information of a unit picture preceding to the object unit picture and the difference information of a unit picture following the object unit picture.

In accordance with the device and method thus configured, difference information indicating a difference between a unit picture and a subsequent unit picture having an identical phase is calculated for each of the unit pictures. Then, it is judged that the object unit picture is a redundant picture if the difference information of the object information is smaller than both of the difference information of a unit picture preceding to the object unit picture and the difference information of a unit picture following the object unit picture. Therefore, the redundant pictures can be correctly and reliably detected.

Further, the judging unit or step may judge that the object unit picture is a redundant picture if the difference information of the object information is smaller than both of the difference information of a unit picture preceding to the object unit picture and the difference information of a unit picture following the object unit picture and if the difference information of the object unit picture is smaller than a predetermined second constant. Thus, the accuracy of the detection may be further improved.

In a preferred embodiment, the above device or method may be used when picture information, in which m unit pictures are to be displayed per second, is converted to picture information of different type in which n unit pictures are to be displayed per second, wherein m and n are natural numbers and m>n.

Preferably, the calculator or the calculating step may calculate a sum of absolute values of luminance differences between each pixel of the unit picture and each corresponding pixel of the subsequent unit picture for all pixels in the unit picture to obtain the difference information. By this, the detection can be made dependently upon the difference information which directly affects the field pictures actually displayed.

According to still another aspect of the present invention, there is provided a picture converting apparatus including: the above redundant picture detecting device and a converter for converting picture information, in which m unit pictures are to be displayed per second, to picture information of different type in which n unit pictures are to be displayed per second, with eliminating the redundant unit pictures based on the judgement result of the judging unit, wherein m and n are natural numbers and m>n.

There is also provided picture converting method including: the above redundant picture detecting method, and a step of converting picture information, in which m unit pictures are to be displayed per second, to picture information of different type in which n unit pictures are to be displayed per second, with eliminating the redundant unit pictures based on the judgement result of the judging step, wherein m and n are natural numbers and m>n.

In accordance with the above apparatus or method, the picture information can be efficiently converted with reliably eliminating the redundant pictures.

Further, there may be provided a picture storage medium on which picture information converted by the picture converting device or method described above is recorded.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings. It is noted that the following description is directed to the case where the present invention is applied to a picture converter which carries out the reverse telecine conversion, for picture information recorded on a VTR, in a picture recording apparatus which manufactures a master disc for mass production of DVD.

[1] Embodiment

Figure 1:
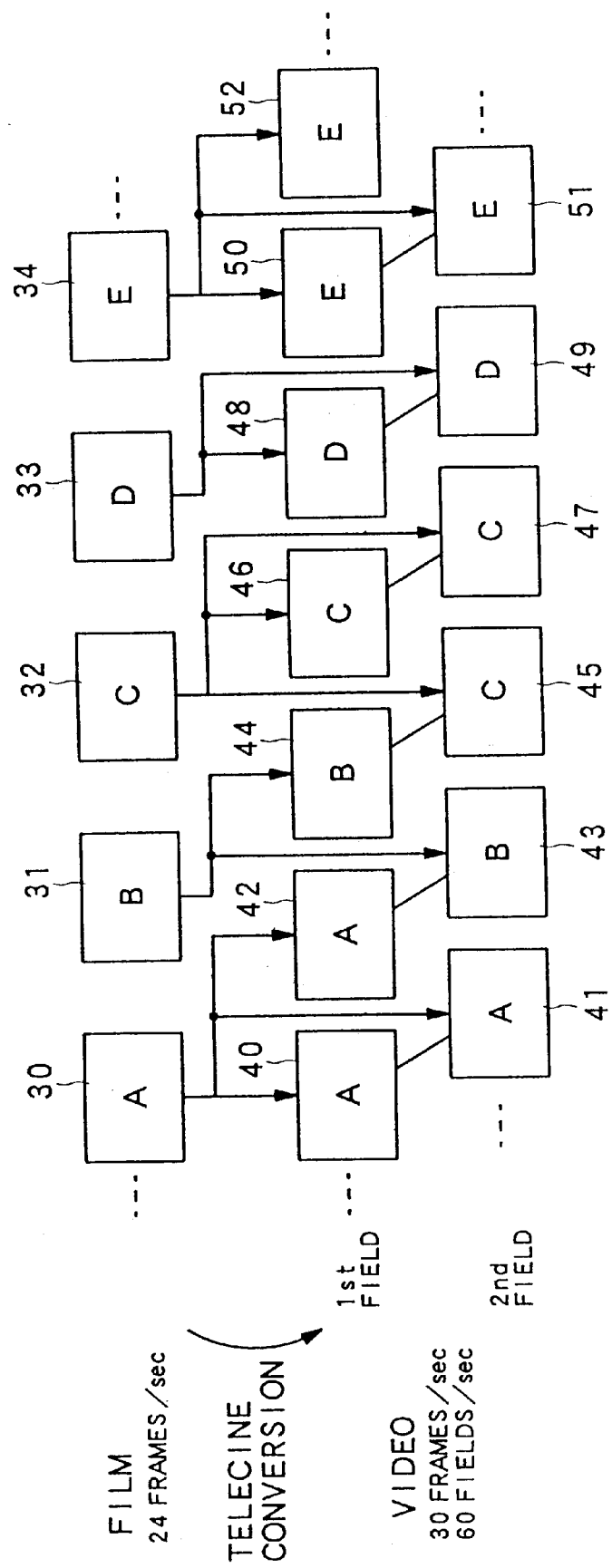
FIG. 1 is a diagram showing a manner of conventional telecine conversion.
Figure 2:
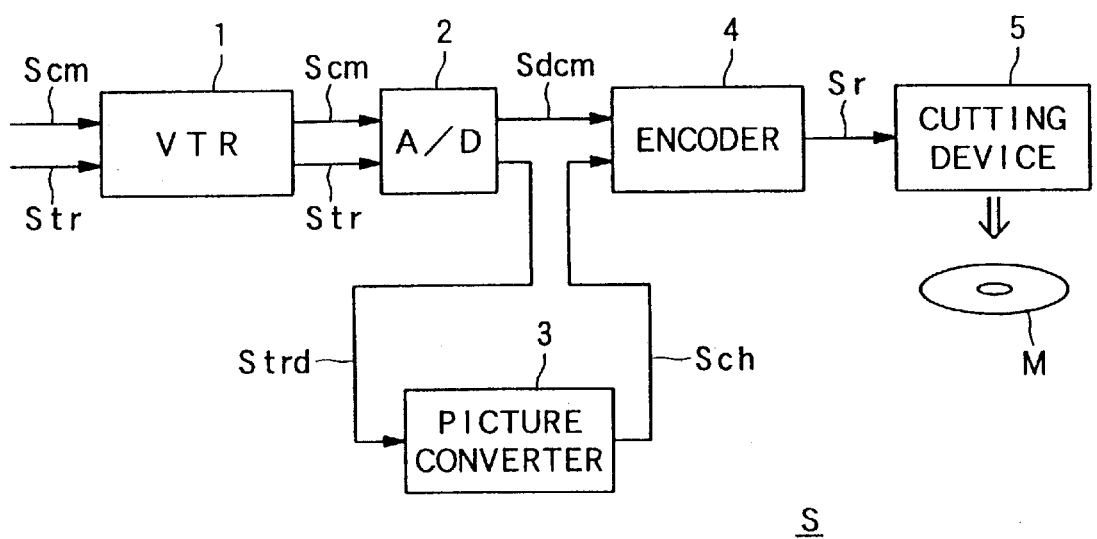
FIG. 2 is a block diagram showing a schematic configuration of the picture information recording apparatus according to the present invention.

FIG. 2 shows the schematic configuration of a picture information recording apparatus according to the present invention. As shown in FIG. 1, the picture information recording apparatus S includes a VTR 1, an A/D converter 2, a picture converter 3, an encoder 4 and a cutting device 5.

The operation of the apparatus S will be described below. The VTR 1 records either a video signal Scm (including 30 frame pictures per second) produced by photographing an object using a TV camera and the like, or a telecine signal Str produced by the telecine conversion. The video signal Scm does not include redundant field pictures as shown in FIG. 1 because its source is not originally a movie material but a video signal, having 30 frame pictures per second, produced by directly taking the picture of an object. If the VTR 1 records the video signal Scm, the VTR 1 supplies it to the A/D converter 2 at the appropriate timing. Alternatively, if the VTR 1 records the telecine signal Str, the VTR 1 supplies it to the A/D converter 2 at the appropriate timing.

On receiving either the video signal Scm or the telecine signal Str, the A/D converter 2 divides one field picture of the inputted signal into 720×480 pixels (in the case in conformity with the international standard ITU-R Recommendation 601) and converts the luminance of each pixel to a digital value to produce the digital video signal Sdcm or the digital telecine signal Strd. Thus, if the video signal Scm is inputted to the A/D converter 2, the A/D converter 2 produces the digital video signal Sdcm and supplies it to the encoder 4. Alternatively, if the telecine signal Str is inputted to the A/D converter 2, the A/D converter 2 produces the digital telecine signal Strd and supplies it to the picture converter 3. The picture converter 3 applies the reverse telecine conversion to the digital telecine signal Strd with eliminating redundant field pictures by the redundant field picture detecting processing of the present invention, and produces and supplies the converted signal Sch to the encoder 4. Thus, the converted signal Sch no longer includes redundant field pictures. The encoder 4 applies coding processing on the digital video signal Sdcm or the converted signal Sch according to MPEG-2 system, and produces and supplies the recording signal Sr to the cutting device 5. The cutting device 5 performs intensity-modulation of a light beam such as a laser beam based on the inputted recording signal Sr, and irradiate it on the rotating original disc on which resist has been applied. Thus, a master disc M is produced which serves as a picture recording medium and which is used for the mass production of DVDs carrying information corresponding to the recording signal Sr.

In the configuration shown in FIG. 2, the telecine signal Str itself may be used as a material of digital broadcasting. Further, it is possible to temporarily store the converted signal Sch in another VTR capable of recording picture information having 24 frame pictures per second, for example, and read it out at appropriate timings to supply it to the encoder 4 for the coding processing.

Figure 3:
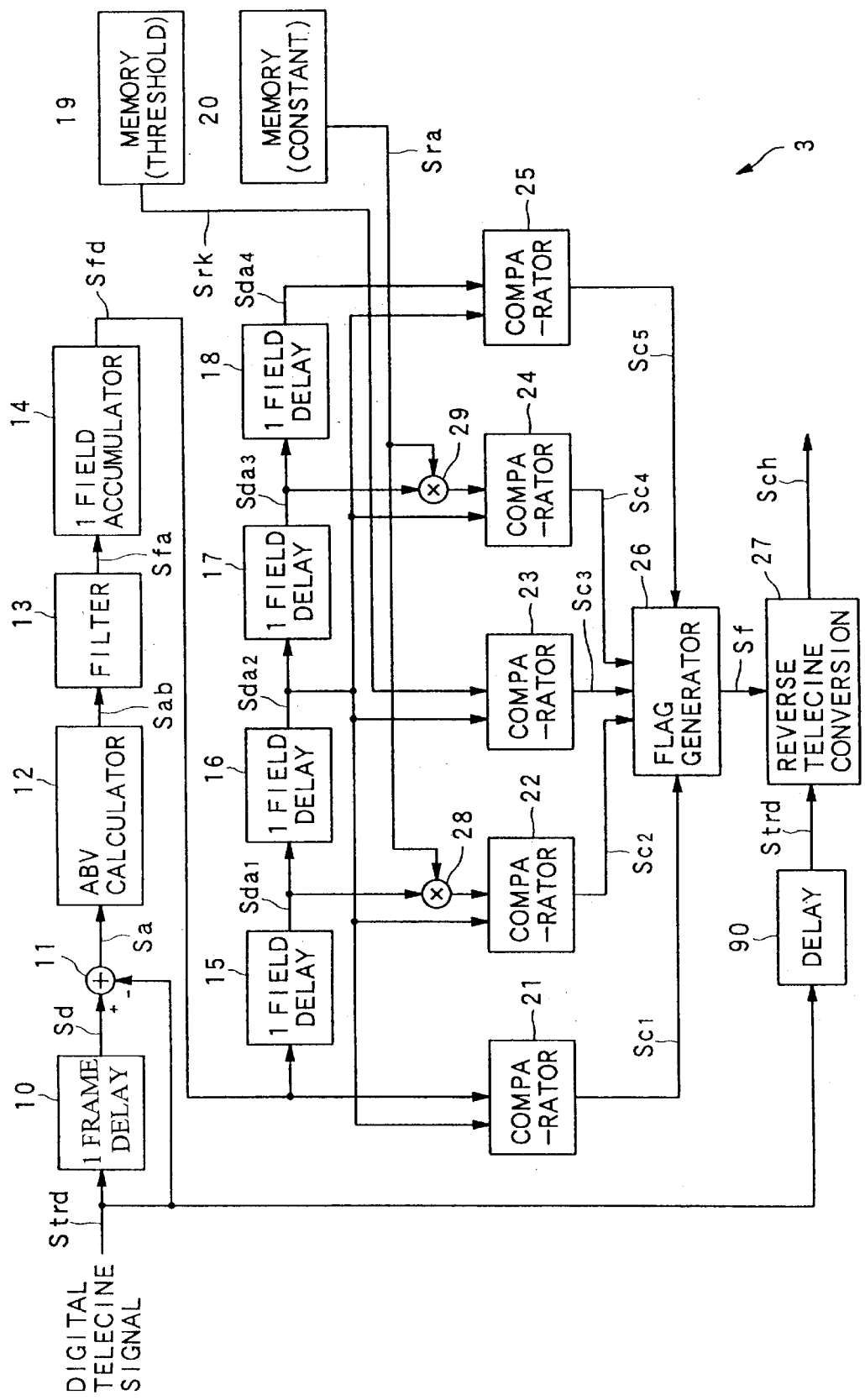
FIG. 3 is a block diagram showing a schematic configuration of the picture converter in FIG. 2.

Next, the detailed configuration of the picture converting device 3 according to the present invention will be described with reference to FIG. 3. As shown in FIG. 3, the picture converter 3 includes a one-frame delay 10, an adder 11, an absolute value calculator 12, a filter 13, a one-field accumulator 14, one-field delays 15 to 18, memories 19 and 20, comparators 21 to 25, a flag generator 26, a reverse telecine converter 27, multipliers 28 and 29, and a delay 90.

Next, the operation will be described. The digital telecine signal Strd (which includes redundant field pictures as shown in FIG. 1) supplied from the A/D converter 2 is fed to the one-frame delay 10, and the reversed signal of the digital telecine signal Strd is supplied to the adder 11. The one-frame delay 10 delays the inputted digital telecine signal Strd by the time corresponding to one frame picture (i.e., two field pictures) and supplies it to the adder 11 as the delayed signal Sd. The adder 11 subtracts, from the digital luminance values for each pixel included in the delayed signal Sd, the corresponding digital luminance values included in the digital telecine signal Strd to produce a subtracted signal Sa, and supplies it to the absolute value calculator 12. The absolute value calculator 12 calculates the absolute value of the subtraction results included in the subtracted signal Sa to produce the absolute value signal Sab, and supplies it to the filter 13.

The filter 13 judges whether or not the absolute value corresponding to each pixel indicated by the inputted absolute value signal Sab is smaller than a predetermined constant value Vc. If the absolute value is smaller than the constant value Vc, the filter generates the filtered signal Sfa indicating "0" and supplies it to the one-field accumulator 14. On the contrary, if the absolute value is not smaller than the constant value Vc, the filter 13 supplies the absolute value itself to the one field accumulator 14 as the filtered signal Sfa. Namely, assuming that a field number is expressed by j, a pixel number is expressed by i and the luminance of the i-th pixel in j-th field is expressed by $X_{j,i}$ (this assumption is effective throughout the specification), the filter 13 generates the filter signal Sfa=$|X_{j-2,1}-X_{j,i}|$ if $|X_{j-2,1}-X_{j,i}|>Vc$, and generates the filter signal Sfa =0 if $|X_{j-2,1}-X_{j,i}|\leq Vc$. This processing by the filter 13 has the purpose to roughly eliminate the adverse effect by the noise introduced into the original digital telecine signal Strd (e.g., during in telecine conversion). Namely, if the luminance difference of corresponding pixels in two successive field pictures is large, it is judged that those field pictures have different picture contents, and the absolute value signal Sab is outputted as it is. On the contrary, if the luminance difference is small, it is judged that those field pictures are fundamentally identical and the difference is resulted by the noise introduction, and the luminance difference is replaced by "0" to nullify the noise component. In this view, the constant value Vc used in the filter 13 should be so determined that the effect of the noise is appropriately and accurately discriminated.

Subsequently, the one-field accumulator 14, which receives the filtered signal Sfa, accumulates the filtered signal Sfa for all pixels included in one field picture to produce the accumulated signal Sfd, and supplies it to the one-field delay 15 and the comparator 21. Here, the accumulated signal Sfd is a summation of the absolute values, for all pixels in a field picture, of the luminance differences between corresponding pixels in two successive field pictures of the same phase included in the digital telecine signal Strd, and the value Sj is expressed as follows:

$$S_j = \sum_{i=0}^{N-1} |x_{j-2,i} - x_{j,i}|$$

Here, N is a total number of pixels within one field picture.

Subsequently, the one-field delay 15 delays the accumulated signal Sfd by the delay time of one field picture to produce the delayed signal Sda1, and supplies it to the multiplier 28 and the one-field delay 16. The one-field delay 16 delays the delayed signal $Sda_1$ by the delay time of one field picture to produce the delayed signal $Sda_2$, and supplies it to the one-field delay 17 and the comparators 21 to 25. The one-field delay 17 delays the delayed signal $Sda_2$ by the delay time of one field picture to produce the delayed signal $Sda_3$, and supplies it to the one-field delay 18 and the multiplier 29. The one-field delay 18 delays the delayed signal $Sda_3$ by the delay time of one field picture to produce the delayed signal $Sda_4$, and supplies it to the comparator 25. At this moment, the memory 19 stores a constant K described later, and outputs the constant signal Srk corresponding to the constant K to the comparator 23. The memory 20 stores a constant C, described later, which is greater than 0 and not greater than 1, and outputs the constant signal Sra corresponding to the constant C to the multipliers 28 and 29. By this, the multiplier 28 multiplies the absolute value sum of each field picture included in the delayed signal $Sda_1$ by the constant C included in the constant signal Sra, and outputs the result to the comparator 22. Similarly, the multiplier 29 multiplies the absolute value sum of each field picture included in the delayed signal $Sda_3$ by the constant C included in the constant signal Sra, and outputs the result to the comparator 24.

Then, the comparator 21 compares the accumulated signal Sfd with the delayed signal $Sda_2$ (the absolute value sum of a field picture included in the delayed signal $Sda_2$ is hereinafter expressed by Sj), and outputs, to the flag generator 26, the comparison signal $Sc_1$ which is "HIGH" if $$S_j < S_{j+2} \quad (1).$$

Namely, the comparison signal $Sc_1$ indicates whether or not the absolute value sum for the field picture subjected to the redundant field detection is smaller than the absolute value sum for the field picture of two fields later in time axis.

The comparator 22 compares the output of the multiplier 28 with the delayed signal $Sda_2$, and outputs, to the flag generator 26, the comparison signal $Sc_2$ which is "HIGH" if $$S_j < CS_{j+2} \quad (2).$$

Namely, the comparison signal $Sc_2$ indicates whether or not the absolute value sum for the field picture subjected to the redundant field detection is smaller than a multiplication result of the absolute value sum for the field picture of one field later in-time axis by the constant C which is smaller than 1.

The comparator 23 compares the constant K included in the constant signal Sra with the delayed signal $Sda_2$, and outputs, to the flag generator 26, the comparison signal $Sc_3$ which is "HIGH" if $$S_j < K \quad (3).$$

The comparator 24 compares the output of the multiplier 29 with the delayed signal $Sda_2$, and outputs, to the flag generator 26, the comparison signal $Sc_4$ which is "HIGH" if $$S_j < CS_{j-2} \quad (4).$$

Namely, the comparison signal $Sc_4$ indicates whether or not the absolute value sum for the field picture subjected to the redundant field detection is smaller than a multiplication result of the absolute value sum for the field picture of one field preceding in time axis by the constant C.

Then, the comparator 25 compares the delayed signal $Sda_4$ with the delayed signal $Sda_2$, and outputs, to the flag generator 26, the comparison signal $Sc_5$ which is "HIGH" if $$S_j < S_{j-2} \quad (5).$$

Namely, the comparison signal $Sc_5$ indicates whether or not the absolute value sum for the field picture subjected to the redundant field detection is smaller than the absolute value sum for the field picture of two fields preceding in time axis by the constant C.

Subsequently, the flag generator 26 judges whether or not the field picture corresponding to the!absolute value sum Sj is redundant field on the basis of the comparison signals $Sc_1$ to $Sc_5$, and outputs the flag signal Sf. Many judgement methods can be used for detecting the redundant field picture based on the comparison signals $Sc_1$ to $Sc_5$. Now, the description will be given of an example which needs simple configuration and is capable of detecting the redundant field picture correctly and reliably. In this example, the flag generator 26 is configured by an AND circuit which receives the comparison signals $Sc_1$, $Sc_2$, $Sc_4$ and $Sc_5$. If all of those comparison signals $Sc_1$, $Sc_2$, $Sc_4$ and $Sc_5$ are HIGH, i.e., if all of the relationships (1), (2), (4) and (5) stand, the flag generator 26 determines that the field picture corresponding to the absolute value sum Sj is a redundant field, produces the flag signal Sf indicating thereof, and supplies it to the reverse telecine converter 27. The reverse telecine converter 27 detects the redundant field picture on the basis of the flag included in the flag signal Sf, and executes the reverse telecine conversion on the digital telecine signal Strd delayed by a certain time by the delay 90, with eliminating the redundant field pictures thus detected, to output the converted signal Sch. The reason why the digital telecine signal Strd is inputted to the reverse telecine converter 27 after passing through the delay 90 is to adjust the timings of the digital telecine signal Strd and the performance of the reverse telecine converter 27.

Now, the processing by the flag generator 26 will be described in further detail. In the above described example of redundant field detection performed by the flag generator 26, roughly two judgements are made. The first judgement is made which judges whether or not the absolute value sum of the field subjected to the redundant field detection (hereinafter referred to as the "object absolute value sum Sjo") is smaller than both the multiplication results of the absolute value sums of the filed pictures one field preceding and one field after the object field picture by the constant C. In addition, the second judgement is made which judges whether or not the object absolute value sum Sjo is smaller than both of the absolute value sums of the field pictures two fields preceding and two fields after the object field picture. If the object absolute value sum Sjo is smaller than all those values, i.e., the both the first and the second judgement results in that the object absolute value is smaller, the flag generator determines that the object field is a redundant field.

The first judgement is based on the fact that if a certain field picture is redundant field picture, its absolute value sum is smaller than the absolute value sums of the preceding and following filed pictures, even if the original digital telecine signal Strd includes noise component of certain degree. This is because that, in theory, the absolute value sum represents only the noise component if the object field picture is a redundant picture. The purpose of multiplying the constant C is to avoid that the comparison signals $Sc_2$ and $Sc_4$ erroneously become HIGH when the object field picture is actually not a redundant field. Namely, if the object absolute value sum is compared with the absolute value sums of the preceding and following field pictures themselves, the object absolute value sum may be smaller than the absolute value sums of the preceding and following field pictures due to the noise component intermixed into only the field picture of the object absolute value sum. This can be avoided by multiplying the constant C prior to the comparison.

On the other hand, the purpose of the second judgement is as follows. The judgement based on the :comparison signals $Sc_2$ and $Sc_4$ may possibly result erroneous judgement according to the kinds and/or amount of the intermixed noise component. In this view, to ensure the correct redundant field detection, the relation with respect to the field pictures of two fields preceding and following are also examined and the redundant field detection is affirmed if the object absolute value sum is also smaller than those absolute value sums.

Figure 4:
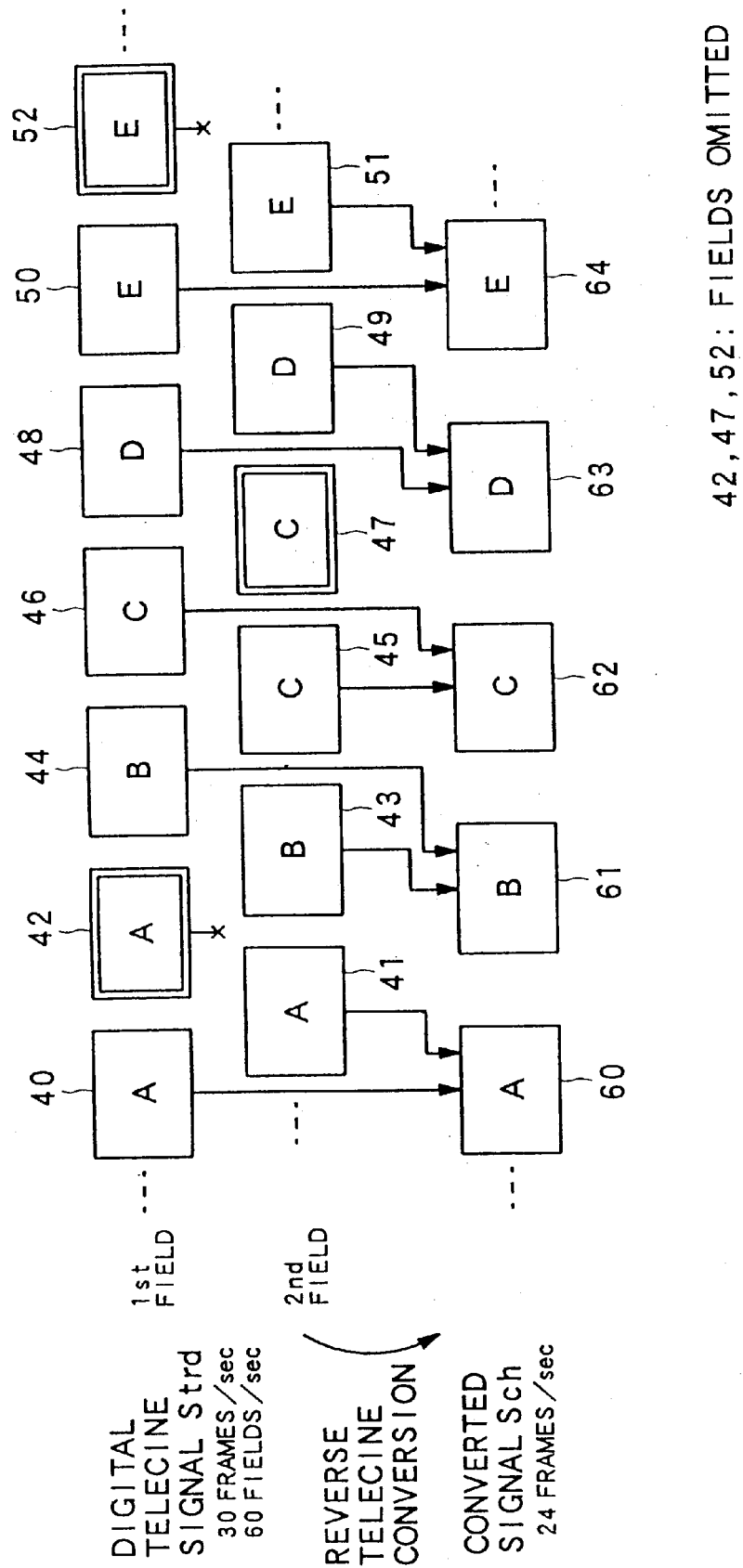
FIG. 4 is a diagram showing a manner of reverse telecine conversion according to the present invention.

Then, as shown in FIG. 4, based on the flag signal indicating the redundant field pictures thus detected, the reverse telecine converter 27 regards the field pictures 42, 47 and 52 as the redundant fields, and produces the converted signal Sch including the frame pictures 60 to 64 from the field pictures except for those redundant field pictures 42, 47 and 52. Then, the converted signal Sc thus produced is supplied to the encoder 4.

As described above, according to the picture information recording device including the picture converter 3, the redundant field pictures are detected based on the relative relation of the object absolute value sum with respect to the absolute value sums of the field picture preceding and following the field picture subjected to the detection. Therefore, the redundant field pictures can be correctly and reliably detected, thereby enabling the production of the converted signal Sch without the redundant field pictures. Further, if the relative relation of the object absolute value sum with respect to the absolute value sums of the field picture which is two fields preceding and two fields following the field picture subjected to the detection is taken into consideration, the accuracy and reliability of the redundant field detection may be further improved. Still further, since the redundant field detection is based on the absolute value sums of the luminance differences of the pixels in successive two fields of the same phase, the detection can be made dependently upon the difference information which directly affects the field pictures actually displayed. In this way, no redundant field picture is recorded on the master disc M manufactured by the picture information recording device S, and hence the recording area of the master disc M can be efficiently used.

[2] Modifications

In the above described embodiment, the redundant field picture is detected based on the comparison signals $Sc_1$, $Sc_2$, $Sc_4$ and $Sc_5$, i.e., all comparison signals except for the comparison signal $Sc_3$. However, in a first modification, all of the comparison signals $Sc_1$ to $Sc_5$ may be used in the detection of the redundant field picture. In this case, the flag generator 26 is configured as an AND circuit which receives all comparison signals $Sc_1$ to $Sc_5$, and the flag signal Sf becomes HIGH when all of the comparison signals $Sc_1$ to $Sc_5$ are HIGH. This also enables correct detection of the redundant fields.

As a second modification, the redundant field picture may be detected by using only the comparison signals $Sc_2$ and $Sc_4$. In that case, the flag generator 26 is configured as an AND circuit which receives only the comparison signals $Sc_2$ and $Sc_4$, and the flag signal Sf becomes HIGH when both the comparison signals $Sc_2$ and $Sc_4$ are HIGH. With this configuration, the picture converter 3 may dispense with the one-field delays 15 to 18, the comparators 21, 23 and 25 and memory 19, and hence the accuracy of the detection is ensured with simplifying the circuit configuration.

As a third modification, the redundant field pictures may be detected by using only the comparison signals $Sc_1$ and $Sc_5$. In that case, the flag generator 26 is configured as an AND circuit which receives only the comparison signals $Sc_1$ and $Sc_5$, and the flag signal Sf becomes HIGH when both the comparison signals $Sc_1$ and $Sc_5$ are HIGH.

Alternatively, as a fourth modification, the redundant field pictures may be detected by using only the comparison signals $Sc_2$, $Sc_3$ and $Sc_4$. In that case, the flag generator 26 is configured as an AND circuit which receives only the comparison signals $Sc_2$, $Sc_3$ and $Sc_4$, and the flag signal Sf becomes HIGH when all of the comparison signals $Sc_2$, $Sc_3$ and $Sc_4$ are HIGH.

Further, as a fifth modification, the redundant field pictures may be detected by using only the comparison signals $Sc_1$, $Sc_3$ and $Sc_5$. In that case, the flag generator 26 is configured as an AND circuit which receives only the comparison signals $Sc_1$, $Sc_3$ and $Sc_5$, and the flag signal Sf becomes HIGH when all of the comparison signals $Sc_1$, $Sc_3$ and $Sc_5$ are HIGH. With this configuration, the flag generator may be simplified because the multipliers 28 and 29 can be omitted.

Figure 5:
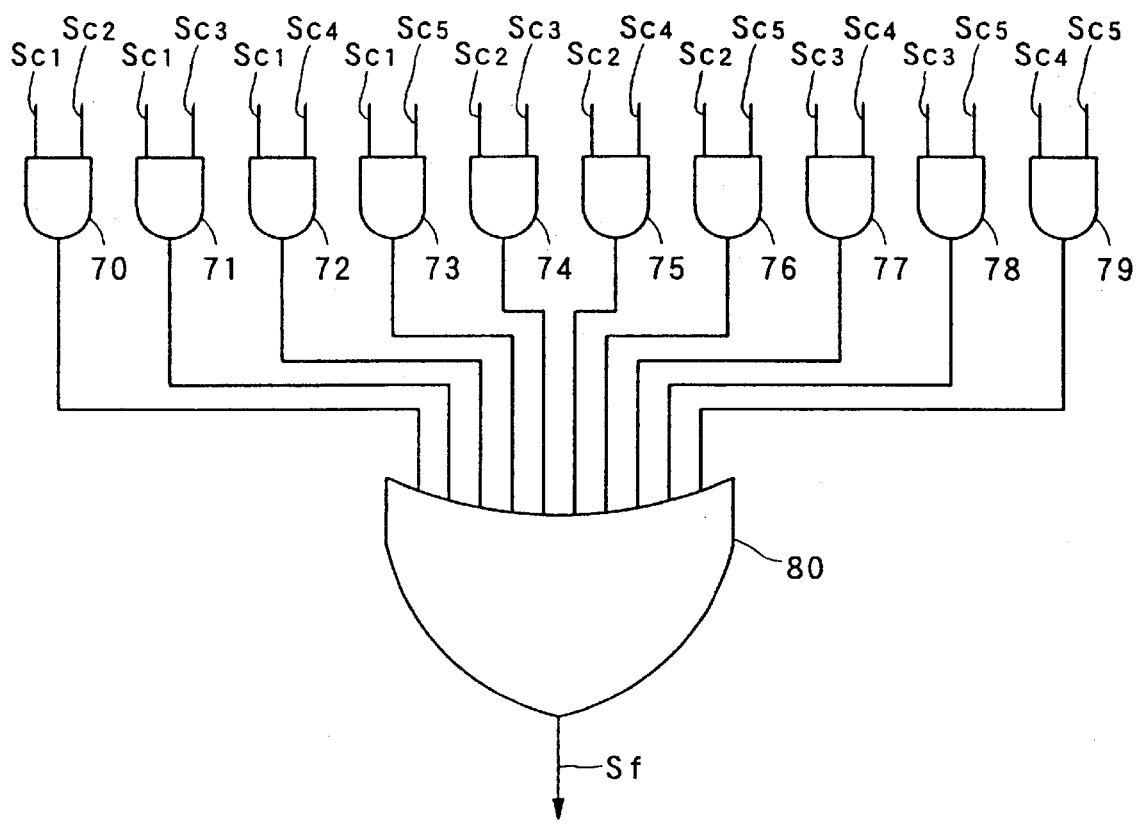
FIG. 5 is a circuit diagram showing an example of the flag generator in FIG. 3.

Still further, as a sixth modification, the redundant field pictures may be detected by using only two comparison signals. Namely, if only two comparison signals are HIGH, the flag signal Sf becomes HIGH. In that case, as shown in FIG. 5, the flag generator 26 is configured to include ten 2-inputs AND circuits 70 to 79 each of which receives two different comparison signals and the OR circuit 80 which receives the output signals from all of the AND circuits 70 to 79 to output the flag signal Sf.

Still further, as a seventh modification, the redundant field pictures may be detected by using only three comparison signals. Namely, if those three comparison signal are all HIGH, the flag signal Sf becomes HIGH. In that case, the flag generator 26 is configured to include ten 3-inputs AND circuits each of which receives three different comparison signals and the OR circuit which receives the output signals from all of the AND circuits to output the flag signal Sf.

Still further, as an eighth modification, the redundant field pictures may be detected by using four comparison signals. Namely, if all of those comparison signal are HIGH, the flag signal Sf becomes HIGH. In that case, the flag generator 26 is configured to include five 4-inputs AND circuits each of which receives four different comparison signals and the OR circuit which receives the output signals from all of the AND circuits to output the flag signal Sf.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.10-072889 filed on Mar. 20, 1998 including the specification, claims, drawings and summary is incorporated herein by reference in its entirety.

What is claimed is:

1. A redundant picture detecting device comprising:
   a calculator for calculating difference information indicating a difference between a unit picture and a subsequent unit picture having an identical phase for each of the unit pictures;
   a multiplier for multiplying the difference information of a unit picture preceding an object unit picture by a predetermined first constant to produce a preceding difference information and for multiplying the difference information of a unit picture following the object unit picture by the first constant to produce a following difference information, the first constant being greater than zero and smaller than 1; and
   a judging unit for judging that the object unit picture is a redundant picture if the difference information of the object unit picture is smaller than both of the preceding difference information and the following difference information.

2. A device according to claim 1, wherein the judging unit judges that the object unit picture is a redundant picture if the difference information of the object unit picture is smaller than both of the preceding difference information and the following difference information and if the difference information of the object unit picture is smaller than the difference information of both the unit picture preceding the object unit picture and the unit picture following the object unit picture.

3. A device according to claim 1, wherein the judging unit judges that the object unit picture is a redundant picture if the difference information of the object unit picture is smaller than both of the preceding difference information and the following difference information and if the difference information of the object unit picture is smaller than a predetermined second constant.

4. A device according to claim 1, wherein said device is used when picture information, in which m unit pictures are to be displayed per second, is converted to picture information of different type in which n unit pictures are to be displayed per second, wherein m and n are natural numbers and m>n.

5. A device according to claim 1, wherein the calculator comprises an operator for calculating a sum of absolute values of luminance differences between each pixel of the unit picture and each corresponding pixel of the subsequent unit picture for all pixels in the unit picture to obtain the difference information.

6. A device according to claim 5, wherein the calculator further comprising a filter for comparing the luminance difference with a predetermined value and for setting the luminance difference to zero if the luminance difference is smaller than the predetermined value.

7. A picture converting apparatus comprising:
   the redundant picture detecting device according to claim 1, and
   a converter for converting picture information, in which m unit pictures are to be displayed per second, to picture information of different type in which n unit pictures are to be displayed per second, with eliminating the redundant unit pictures based on the judgement result of the judging unit, wherein m and n are natural numbers and m>n.

8. A redundant picture detecting device comprising:
   a calculator for calculating difference information indicating a difference between a unit picture and a subsequent unit picture having an identical phase for each of the unit pictures; and
   a judging unit for judging that an object unit picture is a redundant picture if the difference information of the object unit picture is smaller than both of the difference information of a unit picture preceding the object unit picture and the difference information of a unit picture following the object unit picture.

9. A device according to claim 8, wherein the judging unit judges that the object unit picture is a redundant picture if the difference information of the object unit picture is smaller than both of the difference information of a unit picture preceding the object unit picture and the difference information of a unit picture following the object unit picture and if the difference information of the object unit picture is smaller than a predetermined second constant.

10. A device according to claim 8, wherein said device is used when picture information, in which m unit pictures are to be displayed per second, is converted to picture information of different type in which n unit pictures are to be displayed per second, wherein m and n are natural numbers and m>n.

11. A device according to claim 8, wherein the calculator comprises an operator for calculating a sum of absolute values of luminance differences between each pixel of the unit picture and each corresponding pixel of the subsequent unit picture for all pixels in the unit picture to obtain the difference information.

12. A device according to claim 11, wherein the calculator further comprising a filter for comparing the luminance difference with a predetermined value and for setting the luminance difference to zero if the luminance difference is smaller than the predetermined value.

13. A picture converting apparatus comprising:
    the redundant picture detecting device according to claim 8, and
    a converter for converting picture information, in which m unit pictures are to be displayed per second, to picture information of different type in which n unit pictures are to be displayed per second, with eliminating the redundant unit pictures based on the judgement result of the judging unit, wherein m and n are natural numbers and m>n.

14. A redundant picture detecting method comprising the steps of:
    calculating difference information indicating a difference between a unit picture and a subsequent unit picture having an identical phase for each of the unit pictures;
    multiplying the difference information a unit picture preceding an object unit picture by a predetermined first constant to produce a preceding difference information and for multiplying the difference information of a unit picture following the object unit picture by the first constant to produce a following difference information, the first constant being greater than zero and smaller than 1; and
    judging that the object unit picture is a redundant picture if the difference information of the object unit picture is smaller than both of the preceding difference information and the following difference information.

15. A method according to claim 14, wherein the judging step judges that the object unit picture is a redundant picture if the difference information of the object unit picture is smaller than both of the preceding difference information and the following difference information and if the difference information of the object unit picture is smaller than the difference information of both the unit picture preceding the object unit picture and the unit picture following the object unit picture.

16. A method according to claim 14, wherein the judging step judges that the object unit picture is a redundant picture if the difference information of the object unit picture is smaller than both of the preceding difference information and the following difference information and if the difference information of the object unit picture is smaller than a predetermined second constant.

17. A method according to claim 14, wherein said method is used when picture information, in which m unit pictures are to be displayed per second, is converted to picture information of different type in which n unit pictures are to be displayed per second, wherein m and n are natural numbers and m>n.

18. A method according to claim 14, wherein the calculating step comprising the step of calculating a sum of absolute values of luminance differences between each pixel of the unit picture and each corresponding pixel of the subsequent unit picture for all pixels in the unit picture to obtain the difference information.

19. A method according to claim 18, wherein the calculating step further comprising a filtering step of comparing the luminance difference with a predetermined value and for setting the luminance difference to zero if the luminance difference is smaller than the predetermined value.

20. A picture converting method comprising:

the redundant picture detecting method according to claim 14, and a step of converting picture information, in which m unit pictures are to be displayed per second, to picture information of different type in which n unit pictures are to be displayed per second, with eliminating the redundant unit pictures based on the judgement result of the judging step, wherein m and n are natural numbers and m>n.

21. A redundant picture detecting method comprising the steps of:

calculating difference information indicating a difference between a unit picture and a subsequent unit picture having an identical phase for each of the unit pictures; and judging that an object unit picture is a redundant picture if the difference information of the object unit picture is smaller than both of the difference information of a unit picture preceding the object unit picture and the difference information of a unit picture following the object unit picture.

22. A method according to claim 21, wherein the judging step judges that the object unit picture is a redundant picture if the difference information of the object unit picture is smaller than both of the difference information of a unit picture preceding the object unit picture and the difference information of a unit picture following the object unit picture and if the difference information of the object unit picture is smaller than a predetermined second constant.

23. A method according to claim 21, wherein said method is used when picture information, in which m: unit pictures are to be displayed per second, is converted to picture information of different type in which n unit pictures are to be displayed per second, wherein m and n are natural numbers and m>n.

24. A method according to claim 21, wherein the calculating step comprising the step of calculating a sum of absolute values of luminance differences between each pixel of the unit picture and each corresponding pixel of the subsequent unit picture for all pixels in the unit picture to obtain the difference information.

25. A method according to claim 24, wherein the calculating step further comprising a filtering step of comparing the luminance difference with a predetermined value and for setting the luminance difference to zero if the luminance difference is smaller than the predetermined value.

26. A picture converting method comprising:

the redundant picture detecting method according to claim 21, and a step of converting picture information, in which m unit pictures are to be displayed per second, to picture information of different type in which n unit pictures are to be displayed per second, with eliminating the redundant unit pictures based on the judgement result of the judging step, wherein m and n are natural numbers and m>n.

27. A picture storage medium on which picture information converted by the picture converting apparatus according to claim 7 is recorded.

28. A picture storage medium on which picture information converted by the picture converting apparatus according to claim 13 is recorded.

29. A picture storage medium on which picture information converted by the picture converting method according to claim 20 is recorded.

30. A picture storage medium on which picture information converted by the picture converting method according to claim 26 is recorded.

* * * * *